March 17, 1936. A. C. SCHMOHL 2,034,537
CAR CONSTRUCTION
Filed April 19, 1933 2 Sheets-Sheet 1
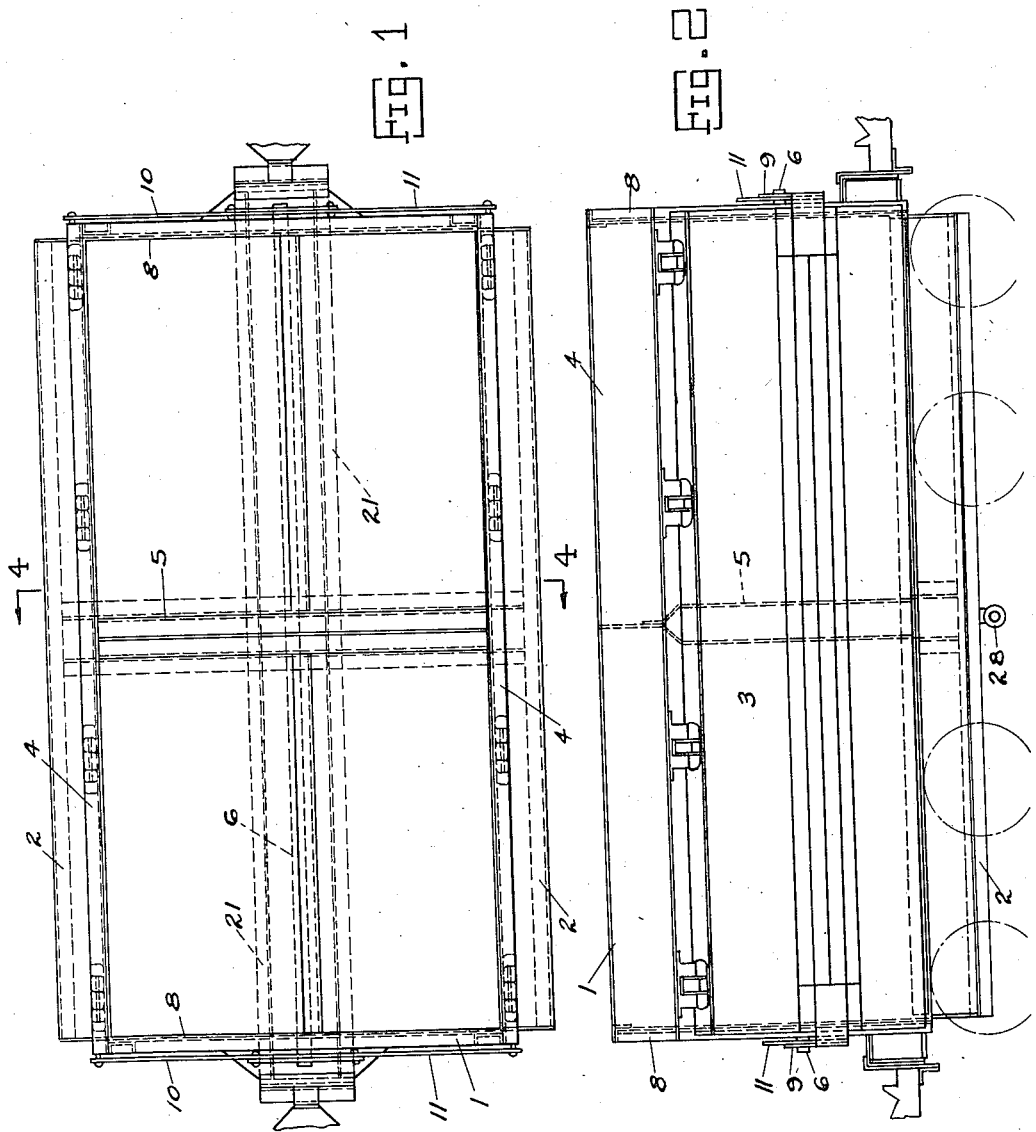
INVENTOR
Alfred C. Schmohl.
BY
ATTORNEY March 17, 1936. A. C. SCHMOHL 2,034,537
CAR CONSTRUCTION
Filed April 19, 1933 2 Sheets-Sheet 2
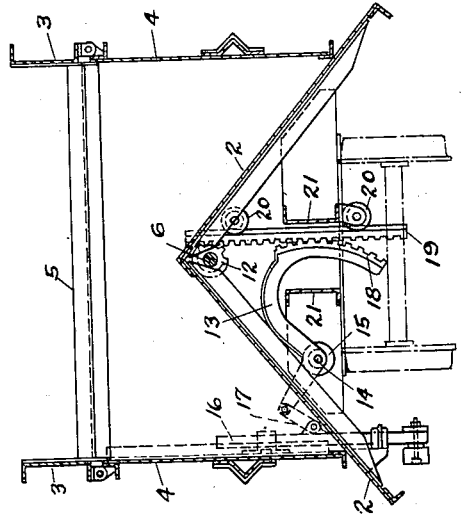
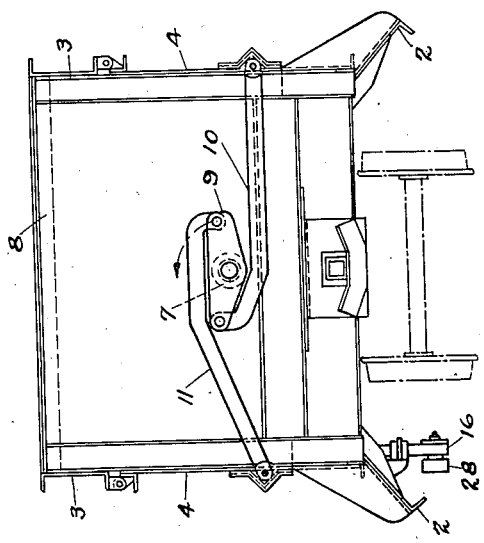
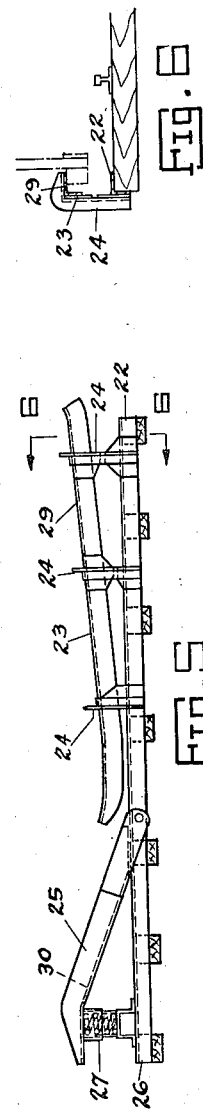
INVENTOR
Alfred C. Schmohl.
BY
ATTORNEY Patented Mar. 17, 1936

2,034,537

UNITED STATES PATENT OFFICE 2,034,537

CAR CONSTRUCTION

Alfred C. Schmohl, Beaver Falls, Pa., assignor to Koppel Industrial Car and Equipment Company, Koppel, Pa., a corporation of Pennsylvania Application April 19, 1933, Serial No. 666,811

4 Claims. (Cl. 105—290)

The hereinafter described invention pertains to door controlling mechanism for cars and particularly that type of mechanism which is actuated by tripping devices which are mounted adjacent the sides of the track upon which the cars are moved. In such a mechanism, means such as a lever on the car engages the tripping device as the car moves along the track and operates the mechanism to release the car doors to discharge the contained lading into an appropriately located receiving bin.

An object of the invention is to provide a door controlling mechanism for dump cars which may be actuated by a tripping device located at the side of the track upon which the car is operated.

Another object of the invention is to provide a tripping device for operating the door controlling mechanism of a dump car moving along the track adjacent an appropriately located receiving bin or station.

A further object of the invention is to provide a door controlling mechanism which automatically locks the doors against movement when they are in closed position.

In the drawings forming a part of this specification Fig. 1 shows in plan a car embodying the invention; Fig. 2 shows a side elevation of the car shown by Fig. 1; Fig. 3 shows an end elevation of the car shown by Fig. 2; Fig. 4 shows a sectional view taken along line 4—4 of Fig. 1; Fig. 5 shows the preferred form of trip arrangement for actuating the door controlling mechanism as the car moves along the track and Fig. 6 shows a sectional view taken along line 6—6 of the trip arrangement shown by Fig. 5.

Referring now in detail to the drawings where like reference characters refer to like parts, reference character 1 indicates a car preferably of the type known as a gable bottom car in which the car floor 2 slopes downwardly and outwardly from adjacent the center line of the car body and the sides 3 of the body are formed in part of doors 4 hinged thereto with the free ends thereof extending downwardly to meet the outer ends of the sloping car floor. The car floor preferably extends outwardly beyond the plane of the side of the car for the purpose of directing the lading away from the car tracks. In one embodiment of the invention, as shown by the drawings, the car body is divided at the transverse center line thereof by means of spaced abutment or partition members 5, which members extend to adjacent the top of the sides of the car, are closed at the top and a portion of the door operating mechanism is mounted between the spaced partitions.

The door operating mechanism comprises a shaft 6 extending longitudinally of the car and rotatably mounted in bearings 7 secured to the ends 8 of the car body. At each end of the shaft is mounted a toggle member 9 normally disposed in a direction transversely of the car and having levers 10—11 mounted on the opposite ends of the toggle. The levers extend transversely of the car and are secured to the opposite car doors. One lever 10 passes under the toggle member and the other lever 11 lying over and above the toggle member. It will be observed that when the shaft 6 is rotated in one direction so as to move the levers 10—11 outwardly towards their respective doors, the side doors are opened to permit discharge of any contained lading and when the shaft is rotated in the opposite direction, the levers move inwardly and as a consequence thereof transmit closing movement to the side doors.

The portion of the door operating mechanism mounted between the partitions at the center of the car comprises a gear wheel 12 mounted on the door operating shaft 6, a lever 13 rotatably mounted on a short shaft member 14 secured in bearings 15 mounted between the partition members 5, a vertically disposed trip shaft 16 mounted adjacent one side of the car body, a lever 17 connecting the trip shaft to the lever 13, a gear segment 18 mounted on the inner end of the rotatable lever 13, a movable rack 19 connecting the gear segment 18 of the lever 13 to the gear 12 mounted on the door operating shaft 6 and suitably disposed rollers 20 preventing displacement of the rack in a direction transversely of the car body. It will be obvious from the drawings that vertical displacement of the rack 19 is prevented by engagement with the gear 12 and segment 18. It will be observed that the rack 19 extends down between the center sills 21 of the car and the inner end of the lever is curved so as to have the gear segment 18 on the end thereof project down between the sills 21 in engagement with the rack 19 when the doors 4 are in closed position. This comprises the entire mechanism mounted on the car.

For the purpose of actuating the trip shaft 16 there is mounted at one side of the car tracks an actuating device comprising a base member 22 having two trip shaft operating members 23 and 25 mounted thereon and converging downwardly and inwardly of the base member. The member 23 is rigidly secured to the base member 22 and is preferably of angular shape having its flanged portion uppermost and disposed in a direction towards the track on which the cars are mounted. This member 23 is spaced from the base member by means of rigid brackets 24 so that it slopes downwardly towards the base member and its inner end approaches the base member but in spaced relation thereto. Pivotally mounted adjacent the intermediate portion of the base member 22 in a manner to underlie the adjacent end of the member 23 is a member 25 which extends upwardly and outwardly towards the end 26 of the base member 22. The outer end of the member 25 being resiliently held in spaced relation to the end 26 of the base member 22. This member 25 is also preferably of angular shape having its flanged portion disposed towards the adjacent car track but at the underside of the member so as to underlie and engage the resilient spacing means 27. The base member is secured in position adjacent the car tracks in such a manner as to permit the flanges of the members to engage a roller or other bearing member 28 secured to the lower end of the trip shaft 16 when the car body moves along the car track past the base member.

The operation of the above described mechanism is as follows: a car filled with lading moves along the track until the roller member 28 on the end of the trip shaft 16 engages beneath the flange 29 of the member 23 of the tripping mechanism. As the car continues to move along the track the tripping shaft is moved downwardly by reason of the engagement of the roller 28 with the member 23. This downward movement of the tripping shaft 16 is transmitted to the lever 13 which in turn is rotated and the gear segment 18 at the end thereof in engagement with the rack 19 moves the rack upwardly causing corresponding movement of the gear 12 mounted on the shaft 6 which imparts motion to the toggles 9 and rotates them in the direction of the arrow causing the doors 4 at the sides of the car body to be moved upwardly and outwardly, permitting the lading within the car to be discharged to opposite sides of the car track. After the car reaches a position intermediate the ends of the tripping arrangement the roller 28 moves out from beneath the flange 29 of the member 23 and onto the flange 30 of the member 25 and with continued movement of the car body the roller, and consequently the trip shaft, is moved upwardly by reason of the engagement of the roller with the member 25 which causes a counter-rotation in the shaft 6 and toggles 9 so as to move the doors at the sides of the car into closed position. As the roller of the trip shaft reaches the end of the member 25 the car doors are in closed position and to prevent any strain being thrown upon the tripping arrangement or the door controlling means the resilient support 27 at the end of the member takes up the shock and permits the member 25 to be depressed as the roller 28 moves out of engagement therewith.

It will be observed that by reason of the location of the toggles 9 and the levers 10—11, and their relation to each other, the doors when closed, are locked in position without any additional securing means until such time as they are released by movement of the trip shaft and its associated mechanism.

It will be apparent to those skilled in the art that various modifications may be made in the individual portions of the door operating mechanism, without departing from the fundamental combination comprising a longitudinally disposed rotatably mounted shaft member having toggle members mounted at the ends thereof, a connection between the toggle member and an adjacent side door, and means such as a trip member suitably connected to the said shaft for imparting rotary motion thereto as the trip member is engaged by a suitable actuating means disposed adjacent the car track during movement of the car along the said track.

Having thus described the invention, what I claim as new and desire to secure by Letters Patent is:

1. In a dump car, in combination, oppositely disposed doors hinged to the body to open upwardly and outwardly, a door operating mechanism comprising oppositely disposed transverse levers and a toggle member, the outer ends of said levers connected to the doors, the inner ends connected to the ends of the toggle member, a rack and gear for actuating said toggle, and means for actuating said gear, said means including a member projecting beyond the car body and adapted to engage an inclined plane disposed externally of the car as the car is moved relative to said plane.

2. In a dump car, in combination, doors hinged to the sides of the car and opening upwardly and outwardly, a longitudinal member having end portions connected to said doors, a member movably mounted on the car, angularly disposed to said longitudinal member and having a portion of its length extending beyond the car for engagement with an operating member disposed exteriorly of and separate from the car and means forming a jointed connection between said longitudinally and angularly disposed members.

3. In a dump car, in combination, hinged doors forming a portion of the sides of said car and opening upwardly and outwardly, a centrally disposed member having its end portions connected to each door, a gear on said member, a member pivotally mounted on the car, said pivotally mounted member being provided with a toothed end portion operably connected with said gear and means on the car for imparting motion to said pivotally mounted member.

4. In a dump car, in combination, hinged doors forming a portion of the sides of the car, a longitudinally disposed member rotatably mounted on the car, a connection between each end portion of said member and said doors, a gear on said member, a member pivotally mounted intermediate its ends on said car, an operating member disposed adjacent one side of the car, having a portion thereof projecting beyond the lading receiving portion of the car and connections between the ends of said pivotally mounted member, said operating member and said gear.

ALFRED C. SCHMOHL.